May 9, 1961 D. R. DENMAN 2,983,490
FERTILIZER DISTRIBUTOR
Filed Aug. 11, 1958
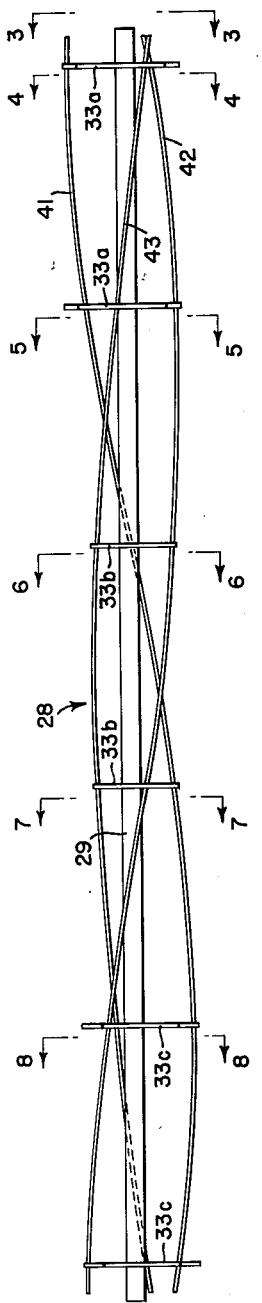
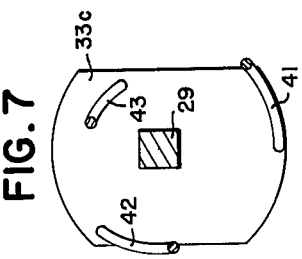
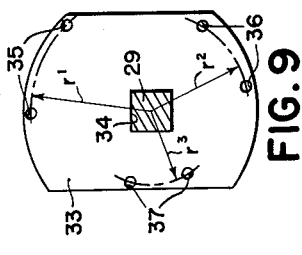
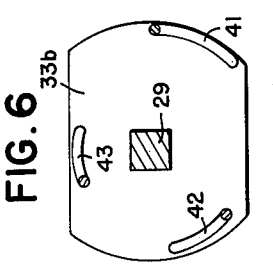
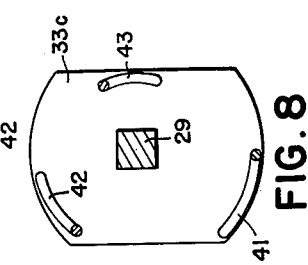
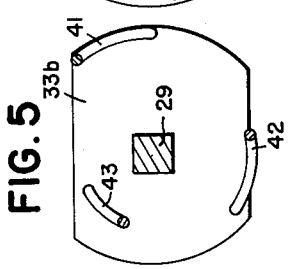
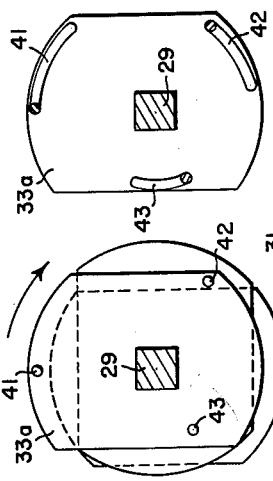
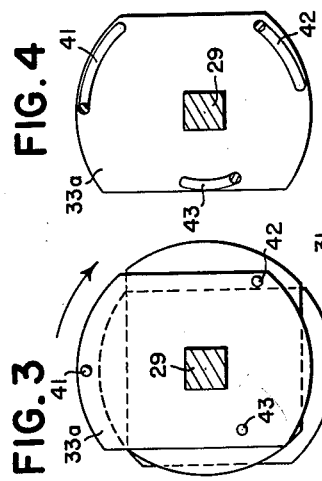
*INVENTOR.*
DONALD R. DENMAN
BY
ATTORNEYS United States Patent Office 2,983,490
Patented May 9, 1961

2,983,490

FERTILIZER DISTRIBUTOR

Donald R. Denman, Horicon, Wis., assignor to Deere & Company, Moline, Ill., a corporation of Delaware Filed Aug. 11, 1958, Ser. No. 754,333

2 Claims. (Cl. 259—136)

The present invention relates generally to agricultural implements and more particularly to distributors for spreading lime, chemical fertilizers and other pulverized material.

The object and general nature of the present invention is a provision of a new and improved agitator particularly adapted for use in the hopper of a fertilizer distributor or the like, and so constructed and arranged as to break up lumps of material with a progressive disintegrating action, whereby hardened conglomerated masses of the material are progressively reduced in size so that such material can be handled effectively by the distributing means.

More specifically, it is a feature of this invention to provide a fertilizer agitator that is made up of helical members arranged in the hopper for rotation about an axis, with the helical members disposed in different radial positions with respect to the axis of rotation, and thus at different distances, respectively, from the adjacent walls or other portions of the fertilizer hoppers. Thus, for example, if a large lump of material is too large to be broken by one of the agitator members that passes close to the hopper wall, another agitator member approaching the lump at a greater distance from the wall might so engage the lump that it will be broken up, and if that particular agitating member does not act effectively on the material then another member, approaching the lump at a greater distance from the hopper wall may engage the hardened mass and break the same into smaller pieces. This progressive action is augmented by the helical formation of the agitating members, which preferably are rod-like parts arranged, respectively, in generally cylindrical surfaces having different radii from the axis of revolution, whereby the above mentioned progressive disintegrating action is secured.

These and other objects and advantages of the present invention will be apparent to those skilled in the art after a consideration of the following detailed description, taken in conjunction with the accompanying drawings, in which:

Fig. 1 is a sectional view taken through the hopper of a fertilizer distributor having an agitator incorporating the features of this invention.

Fig. 2 is an elevation at a larger scale of the agitator shown in Fig. 1.

Fig. 3 is an end sectional view taken along the line 3—3 of Fig. 2.

Fig. 4 is a sectional view taken generally along the line 4—4 of Fig. 2.

Fig. 5 is a sectional view taken generally along the line 5—5 of Fig. 2.

Fig. 6 is a sectional view taken generally along the line 6—6 of Fig. 2.

Fig. 7 is a sectional view taken generally along the line 7—7 of Fig. 2.

Fig. 8 is a sectional view taken generally along the line 8—8 of Fig. 2.

Fig. 9 is an elevation of one of the rod-supporting plates.

Referring first to Fig. 1, the fertilizer hopper is indicated in its entirety by the reference numeral 10 and comprises a container having front wall means 15, rear wall means 16, and bottom wall means 17. The lower portion of the hopper is provided with suitable fertilizer impeller or feed wheel means 23 disposed above the bottom 17 of the hopper. Above the feed wheels 23 is a baffle 24 that extends downwardly and rearwardly from the front wall means 15. A screen member 25 is carried by the lower edge of the baffle 24 and connects with the rear wall 16.

Disposed in the upper portion of the hopper, immediately above the screen 25, is a fertilizer agitator means 28 in which the principles of the present invention have been incorporated. The agitator 28 comprises a central shaft 29 supported at its end by suitable bearing means in the end walls 31 of the hopper 10. Suitable means, not shown, is provided for rotating the shaft 29. A plurality of pairs of plates 33a, 33b and 33c are fixed to the shaft 29 in axially spaced apart relation, the plates being preferably welded to the shaft 29. The plates are identical, but the pairs 33a, 33b, and 33c are fixed to the shaft 29 in different positions spaced angularly at about 90° relative to one another.

As best shown in Fig. 9, each plate comprises an elongated noncircular member 33 apertured, as at 34, to receive the shaft 29. It will be seen that the shaft-receiving opening 34 is closer to one end of the plate than the other, and, further, that the opening 34 is closer to one side of the plate than it is to the other side. A pair of openings 35 is provided in the longer end of the plate 33 and these openings are disposed at the same radial distance $r^1$ from the axis of the opening 34. A second pair of openings 36 are disposed adjacent the other end of the plate 33, and these openings are also disposed at the same radial distance $r^2$ from the axis of the shaft-receiving opening 34, but the distance $r^2$ is somewhat less than the radial distance $r^1$ from the shaft to the first mentioned pair of openings 35. A third pair of openings 37 is formed in the plate 33, and also these openings are disposed at the same radial distance $r^3$ from the shaft opening 34, but the distance $r^3$ is less than the radial spacing $r^2$ of the openings 36 from the shaft opening 34.

The plurality of plates are fixed on the shaft 29 in pairs so that, as best shown in Fig. 2, the first pair of plates 33a are disposed with their longitudinal axes parallel to one another and transversely of the shaft 29, or vertical as shown in Figs. 3 and 4. The next pair of plates 33b are disposed with their longitudinal axes parallel, but the second pair of plates 33b are fixed in a position rotated through approximately 90° about the axis of the shaft 29 as shown in Figs. 5 and 6. The third pair of plates 33c are arranged in similar fashion, being rotated 90° with respect to the second pair of plates 33b.

The plurality of plates 33a, 33b and 33c carry three agitator members in the form of resilient rod-like parts, each of which is formed as a helix lying in a generally cylindrical surface. The outermost rod, indicated at 41, lies in a cylindrical surface, the radius of which corresponds to the radial distance $r^1$ between the axis of the shaft 29 and the plate openings 35 (Fig. 8). In the assembly of the agitator unit, the rod 41 is inserted through first the left hand opening 35 in the first plate 33a and then through the right hand opening 35 in the second plate 33a. Next the rod 41 is inserted through the left hand opening 36 in the third plate 33b and then through the right hand openings 36 in the next or fourth plate 33b, passing from right to left as viewed in Fig. 2. Lastly, the rod 41 is then inserted through one of the openings 37 in the fourth plate 33c and in the other opening 37 in the sixth plate 33c. By virtue of the 90° angular spacing of the several pairs of plates and by virtue of the particular location of the plate openings 35 and 36 and 37, the rod 41 is maintained in its cylindrical spiral relationship. It will be observed from Figs. 1 and 9 that the openings 35 in the longer ends of the plates 33 are disposed relatively closely adjacent the edge of the plate, whereby when the agitator unit is rotated the rod 41 passes fairly close to the adjacent portions of the hopper and/or the screen 25.

The second agitator part is indicated at 42 and it also is a helical member lying in a cylindrical surface, the radius of which corresponds to the radial distance $r^2$ from the openings 36 to the center of the shaft-receiving opening 34. The rod 42 is threaded through the openings 36 in the several plates 33a, 33b and 33c in substantially the same manner as described above, but it will be observed that the rod 42 moves in a path of rotation that is farther from the adjacent hopper parts than the path or movement of the rod 41. The third rod 43 is also a helical part and is threaded through the openings 37 that lie in a cylindrical surface the radius of which corresponds to the radial distance $r^3$ between the rods 37 and the axis of the shaft 29. The rod 43 is threaded through the openings 37 in the several plates 33a, 33b and 33c in the same manner as described above. As will be observed from Fig. 1, the rod 43 occupies a distance farthest away from the adjacent hopper parts.

In operation, by virtue, first, of the spiral configuration of the several rods 41, 42 and 43, and more importantly by virtue of the different radial distances, the agitator rods exert a progressive pulverizing action on lumps and other firmly conglomerated masses of hardened fertilizer. The rods thus cooperate with the screen 25 so that all of the lumps and masses are broken down into pieces small enough to pass through the screen 25 and therefore small enough to be handled by the impeller or feed mechanism 23.

While I have shown and described above the preferred structure in which the principles of the present invention have been incorporated, it is to be understood that my invention is not to be limited to the particular details, shown and described above, but that in fact, widely different means may be employed in the practice of the broader aspects of my invention.

What I claim, therefore, and desire to secure by Letters Patent is:

1. In a fertilizer distributor, agitator means comprising a shaft, a plurality of pairs of elongated plates fixed in axially spaced apart relation, a first pair of plates being fixed to the shaft with their longitudinal axes parallel to one another and transverse relative to the shaft, the next adjacent pair of plates being fixed to the shaft with their longitudinal axes parallel to one another and rotated through 90° about the shaft axis, and a third pair of plates being arranged with their longitudinal axes parallel to one another and rotated through 90° about the shaft relative to the longitudinal axes of the plates of said second pair, each of said plates having three pairs of openings therein arranged about the axis of said shaft, a first pair of openings disposed adjacent one end of said plate and spaced the same distance from the shaft axis, a second pair of openings adjacent the other end of said plate and spaced the same distance from said shaft axis, said latter distance being less than the distance of said first pair of openings, and a third pair of openings in the plate also spaced the same distance from the shaft axis, said latter distance being less than said second mentioned distance, and three elongated helical members threaded through openings in said plates, said helical members having different radii, one helical member being threaded through first one and then the other of said first pairs of openings in said plates, a second helical member being threaded through first one and then the other of said second pairs of openings in said plates and the third helical member being threaded through first one and then the other of said third pairs of openings of said plates.

2. In a fertilizer distributor, agitator means comprising a shaft, a plurality of pairs of elongated plates fixed in axially spaced apart relation, a first pair of plates being fixed to the shaft with their longitudinal axes parallel to one another and transverse relative to the shaft, the next adjacent pair of plates being fixed to the shaft with their longitudinal axes parallel to one another and rotated through a given angle about the shaft axis relative to the first pair of plates, each of said plates having a first pair and a second pair of openings therein arranged about the axis of said shaft, the openings of each of said first pairs of openings being spaced the same distance from said shaft and the openings of each of said second pairs of openings being spaced the same distance from said shaft but the spacing of the openings of the second pairs of openings being different than the spacing of the openings of the first pairs of openings, a plurality of elongated helical members threaded through first one and then the other of the openings of said first pairs of openings in said plates, and a second plurality of helical members threaded through first one and then the other of the openings of said second pairs of openings in said plates.

References Cited in the file of this patent
UNITED STATES PATENTS

| | | |
|---|---|---|
| 1,001,508 | Craig | Aug. 22, 1911 |
| 1,036,374 | Temple | Aug. 20, 1912 |
| 2,118,616 | McConnaughay | May 24, 1938 |
| 2,848,143 | Gandrud | Aug. 19, 1958 |